United States Patent [19]

Enders

[11] 4,214,939
[45] Jul. 29, 1980

[54] TIRE BUILDING MACHINE

[75] Inventor: George E. Enders, Salem, Ohio

[73] Assignee: NRM Corporation, Akron, Ohio

[21] Appl. No.: 886,742

[22] Filed: Mar. 15, 1978

[51] Int. Cl.$^2$ .................. B29H 17/12; B29H 17/26
[52] U.S. Cl. .................................. 156/398; 156/132; 156/401; 156/416
[58] Field of Search ....... 156/110 R, 123 R, 131–133, 156/394 R, 398–403, 414–420

[56] References Cited

U.S. PATENT DOCUMENTS

| | | | |
|---|---|---|---|
| 3,035,629 | 5/1962 | Van Zo et al. | 156/403 |
| 3,053,308 | 9/1962 | Vanzo et al. | 156/132 |
| 3,134,079 | 5/1964 | Giletta et al. | 156/416 |
| 3,160,545 | 12/1960 | Burton | 156/415 |
| 3,402,090 | 9/1968 | Henley | 156/398 |
| 3,433,659 | 3/1969 | Caretta et al. | 156/401 |
| 3,526,561 | 9/1970 | Benns | 156/416 |
| 3,647,598 | 3/1972 | Gazuit | 156/415 |
| 3,692,605 | 9/1972 | Cantarutti | 156/133 |
| 3,718,520 | 2/1973 | Leblond | 156/416 |
| 3,721,600 | 3/1973 | Cantaru | 156/401 |
| 3,740,293 | 6/1973 | Jones et al. | 156/415 |
| 3,784,437 | 1/1974 | Appleby et al. | 156/401 |
| 3,853,653 | 12/1974 | Olbert et al. | 156/128 R |
| 3,862,871 | 1/1975 | Held et al. | 156/415 |
| 3,864,189 | 2/1975 | Galleithner et al. | 156/415 |
| 3,922,187 | 11/1975 | De Nardis | 156/415 |
| 4,011,126 | 3/1977 | Eichholz | 156/416 |
| 4,011,127 | 3/1977 | Eichholz et al. | 156/132 |
| 4,081,310 | 3/1978 | Shichman et al. | 156/131 |
| 4,087,306 | 5/1978 | Head et al. | 156/132 |

FOREIGN PATENT DOCUMENTS 2227121  11/1974  France .

Primary Examiner—John E. Kittle
Attorney, Agent, or Firm—Maky, Renner, Otto & Boisselle

[57] ABSTRACT

A tire building machine of the expandable bead lock type employs an elastomeric specially shaped radially expanding bead lock which includes an air passage system therethrough. The bead locks are expanded by a pneumatic tube which seats the bead lock against reentrant shoulder stops securing the bead locks in their expanded condition both precisely radially and axially with respect to the two centerlines of the machine. Such bead locks may be used in connection with an expandable axially fixed center deck for first stage operations or in connection with a substantially rigid axially expandable and contractible center deck for single stage operations. The bead locks may also be employed for second stage operations. For a single stage machine, the preferred form of center deck includes axially oppositely extending fingers which slide in respective slots in the center support forming a substantially rigid working surface. In connection with single and first stage operations, the bead locks may include integrally formed shaping bladders which are inflated through the air passage system in the bead locks. An additional bladder may be employed at each end of the machine cooperating with the bladder formed integrally with the bead locks for turning tire components about the beads and for assembling components such as sidewalls to the carcass when in toroidal shape. The bladders are specially constructed and molded so that the components may be wrapped or applied tangentially and sequentially from the bead outwardly to avoid distortion. Components of the machine, whether used as a single stage, first stage, or second stage machine are common.

58 Claims, 13 Drawing Figures

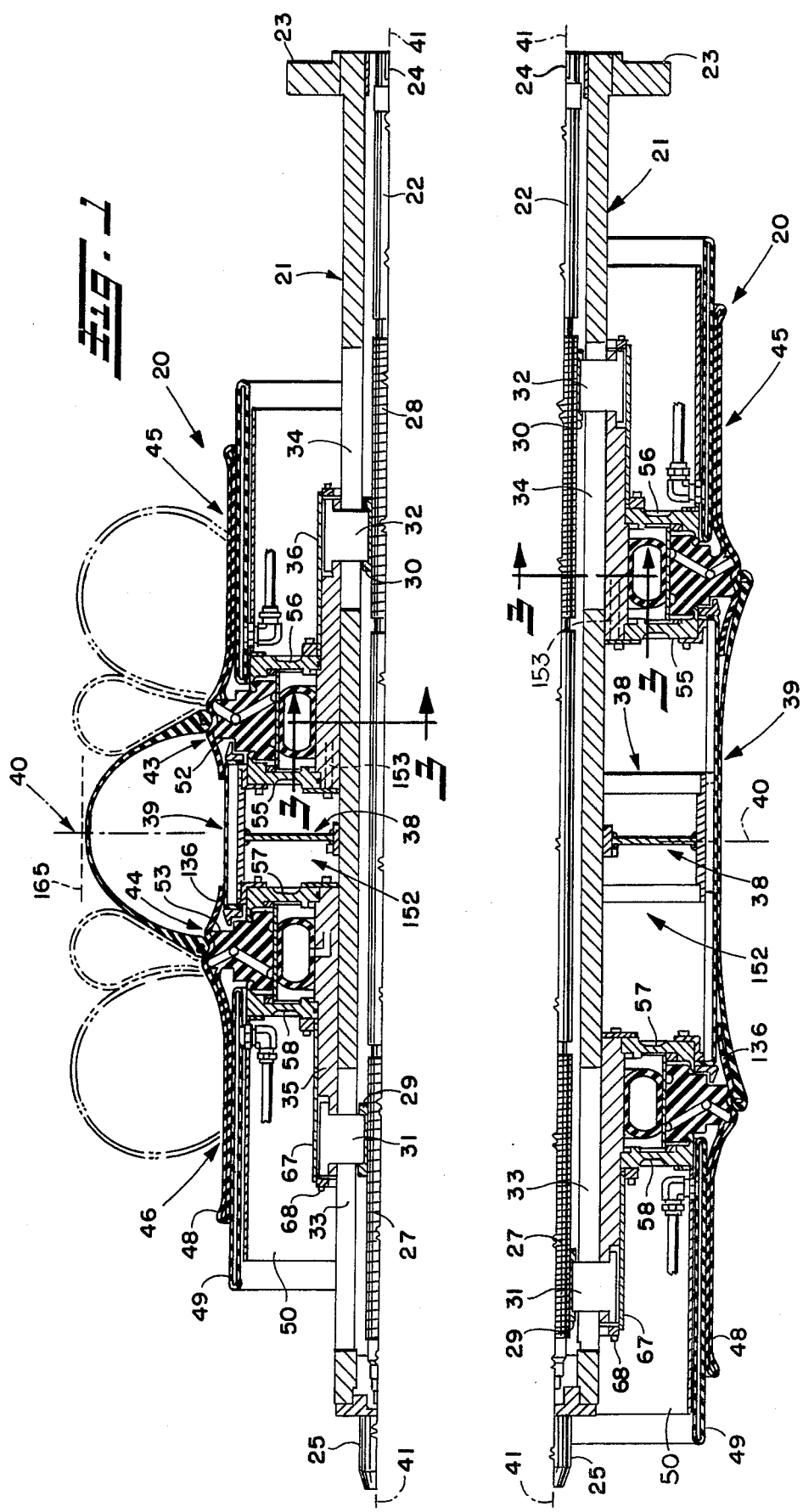

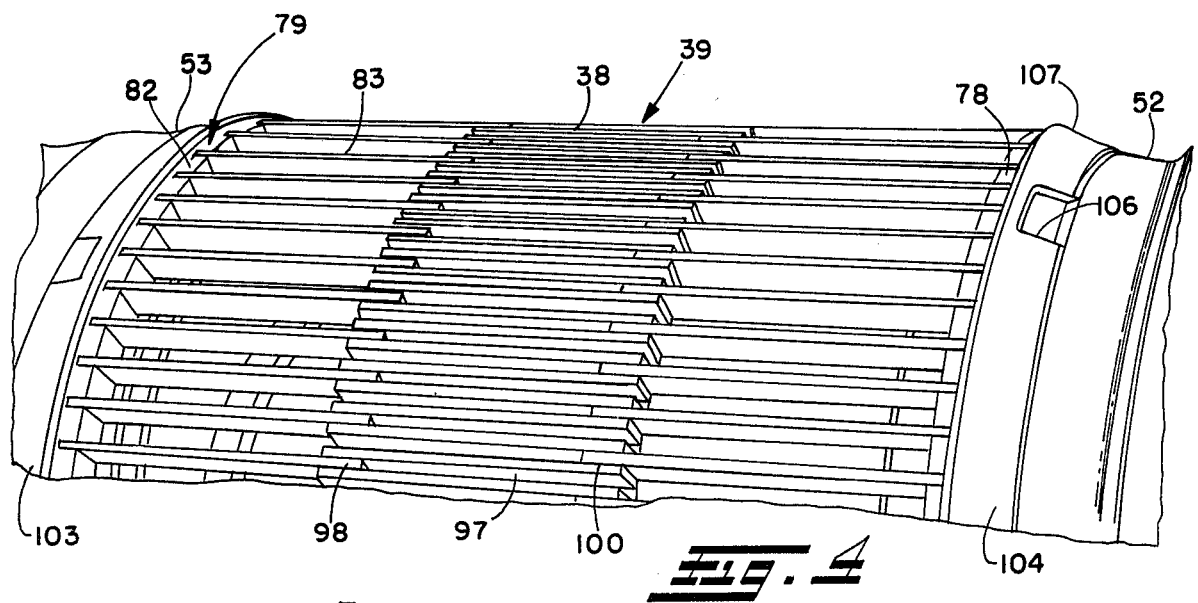
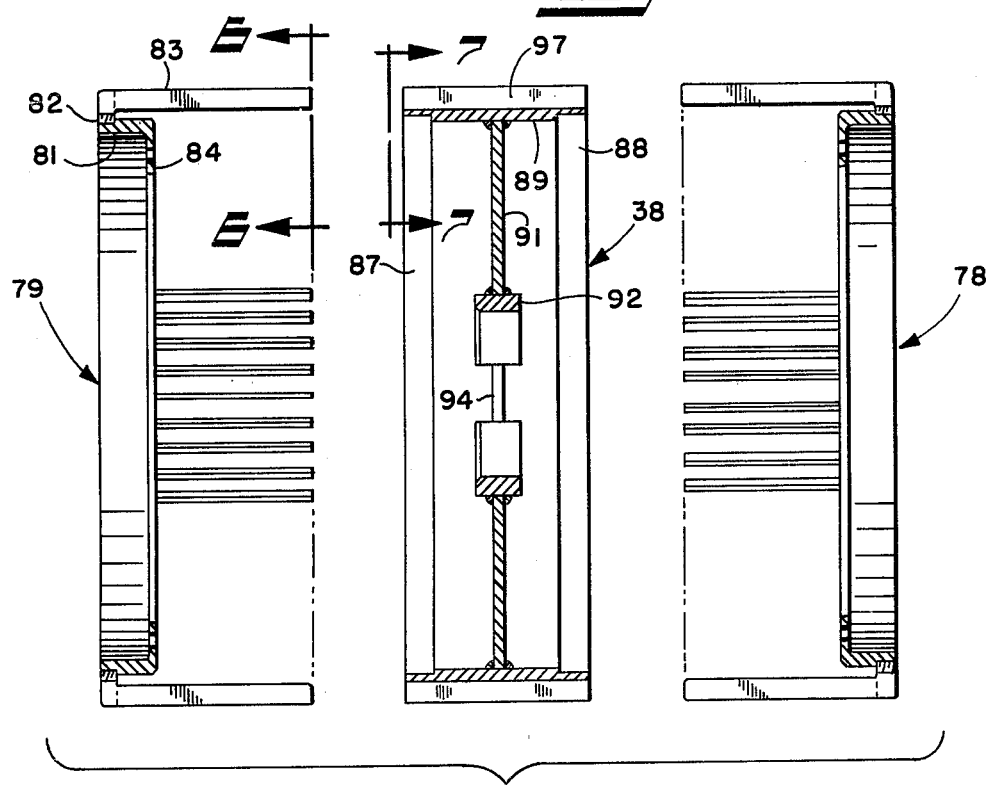
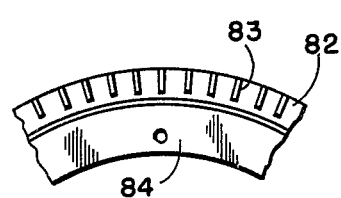
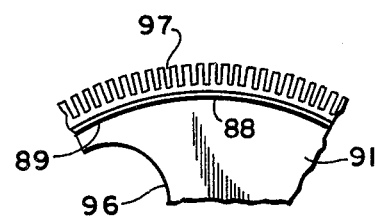

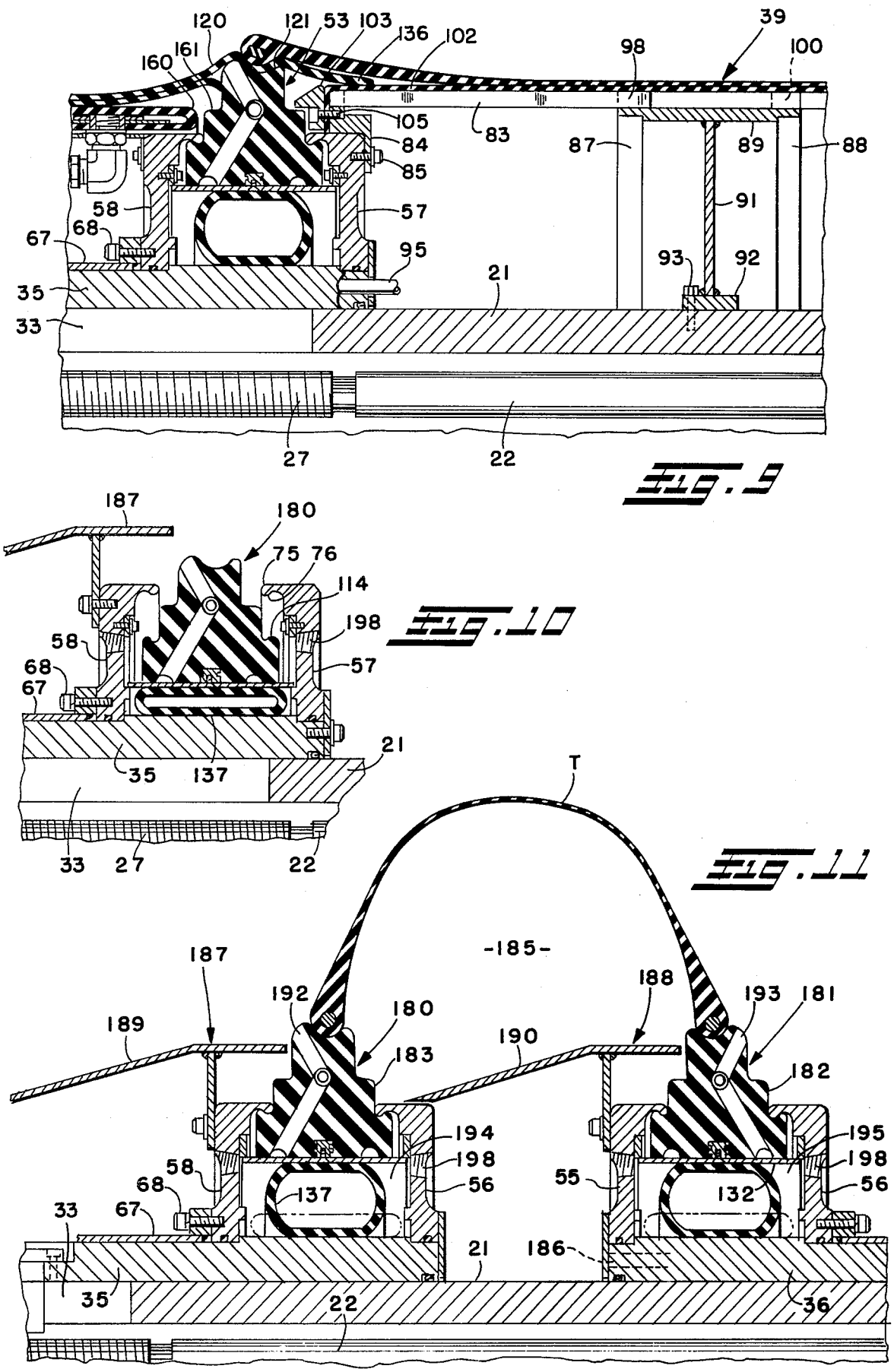

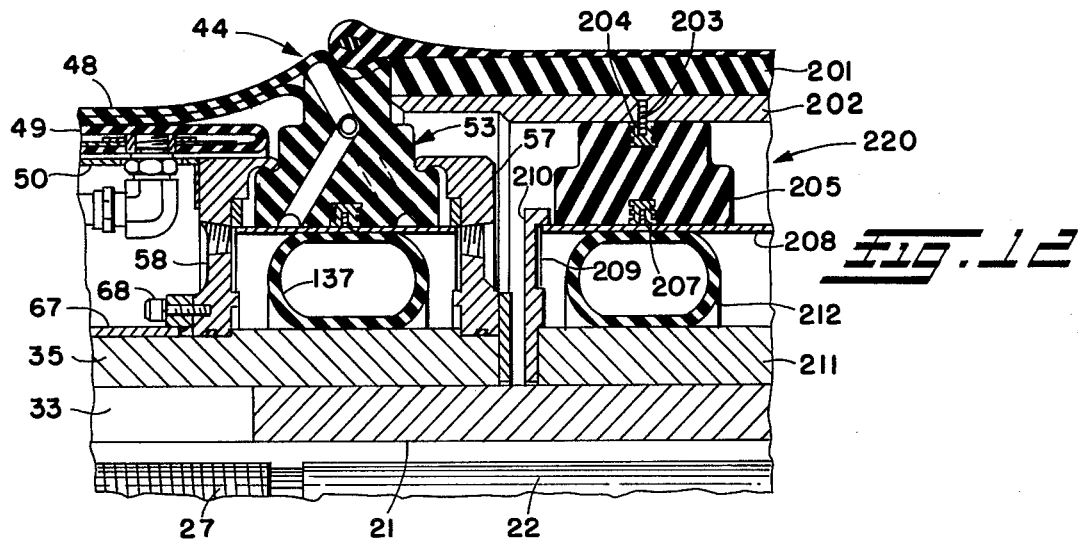
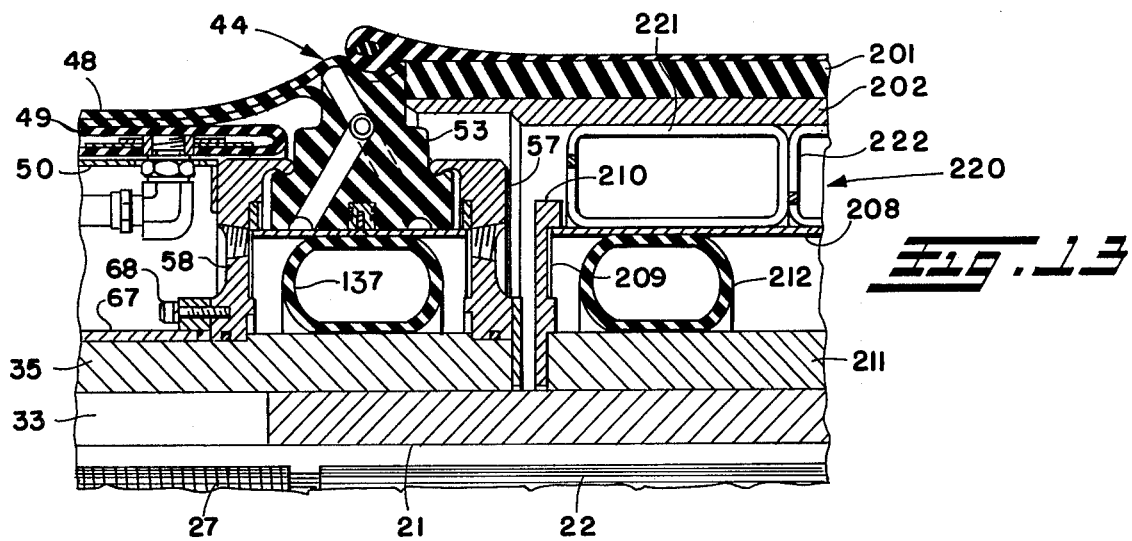

TIRE BUILDING MACHINE

This invention relates generally as indicated to a tire building machine and more particularly to a tire building machine of the bead lock type wherein common components may be employed whether the machine is utilized as a single stage machine, a first stage machine, or a second stage machine. The invention finds particular application in the construction of larger and intermediate size tires such as truck or recreational vehicle tires. However, it will be appreciated that the features of the invention may also be employed in connection with smaller passenger size tires.

BACKGROUND OF THE INVENTION

In a single stage machine a tire is constructed in a generally continuous process being initially built flat or cylindrical and then shaped to its toroidal shape for final application of the belt and tread assembly either separately constructed or constructed directly on the tire after thus shaped. In a first stage machine the tire is constructed in a cylindrical or flat band form and then removed to a second stage machine or shaper wherein it is converted to toroidal shape for final application of components such as the belt and tread assembly.

Whether the machine be single, first or second stage, the beads of the tire must be properly supported and locked for the application or wrapping of the components thereabout. In a single or second stage machine, the bead locks move uniformly toward each other as the tire is expanded and converted from its generally cylindrical to a toroidal or tire shape. Regardless of the type of machine utilized, the beads must be precisely held and positioned both with respect to the axial centerline of the machine as well as the transverse centerline. The beads must be equidistant from the transverse centerline which is through the crown of the tire. In addition, the bead locks in the shaping operation without a shaping sleeve desirably provide an air seal so that air under pressure within the tire will shape it to its desired toroidal shape.

Radially expandable bead locks have been employed in tire construction and reference may be had to the following U.S. patents as examples of such bead lock constructions employed: U.S. Pat. Nos. Giletta et al 3,134,079; Olbert et al 3,853,653; Caretta et al 3,433,695; Henley 3,402,090; Held et al 3,862,871; Vanzo et al 3,035,629; and Cantarutti 3,721,600.

It is also known to provide tire building machines which include a radially expansible center deck such as seen in Burton U.S. Pat. No. 3,160,545, Appleby et al U.S. Pat. No. 3,784,437, and Jones et al U.S. Pat No. 3,740,293. Also, some center decks collapse axially as the tire is expanded as seen, for example, in Galleithner et al U.S. Pat. No. 3,864,189 and the above noted Appleby patent. Some are axially adjustable in length as seen in Gazuit U.S. Pat. No. 3,647,598.

Where an elastomeric bead lock is employed, because of the inherent nature of any rubber band, it is difficult properly to seat and control the expansion and contraction of the bead lock to obtain precise centering of the beads both radially and axially. Any rubber band when elongated, narrows in cross section and accordingly the dimensions in the stressed and unstressed conditions are not the same. Also, when the bead lock includes an integrally formed shaping bladder, it is difficult to supply such bladder with inflation air pressure without unduly confining it thus precluding it from doing its desired function. The bladder is usually inherently restricted by an inlet or stem offset from the bead lock as seen in French Pat. No. 2,227,121 dated Apr. 22, 1974, or in the above noted Cantarutti U.S. Pat. No. 3,721,600.

Further, in a single stage machine, particularly when constructing larger and more complex tires, it is desirable to apply tire components such as chafers, body plies, or belt cushions which should desirably be stitched. Accordingly, between such bead locks there should be a center deck which is substantially rigid throughout its length to permit such stitching and yet which will axially contract as the tire is brought to its toroidal shape.

SUMMARY OF THE INVENTION

An elastomeric bead lock of the radially expansible type is employed and may be used in single, first or second stage operations on common machine shafting. The bead lock is provided with significant shoulders which cooperate with reentrant shoulder stops closely confining the neck of the bead lock against both radial and axial movement when expanded. The bead lock is provided with a network of air passages which may vent the interior of the bead lock or be employed to inflate a bladder formed integrally therewith. Such passages may be employed for inflating a bladder without complex hoses or piping since the aforementioned shoulder stops form an air seal when the bead lock is expanded. The center main circumferential air passage in the bead lock as well as the branch passages may be formed with a molded-in garter spring which maintains such passages open even when the bead lock is expanded.

When used as a single stage machine, a substantially rigid center deck is employed which may be axially expanded and contracted. The center deck is composed of an array of axially inwardly extending fingers which interfit and which are supported in the center slots in a rigid center support.

The machine may include a dual shaping bladder assembly, the outer of which is formed integrally with the bead lock and inflated therethrough. The bladders are especially constructed and molded to obtain the desired application of the plies or components to the carcass so that they are applied uniformly tangentially and sequentially away from the bead. Such bladders may be inflated to assist the bead locks in locking the beads. Other forms of center decks are disclosed using common components. The center deck may also be positioned radially inwardly of the beads in their locked condition so that a tire may be built by the negative crown method.

It is accordingly a principal object of the present invention to provide a tire building machine utilizing a radially expansible bead lock which when expanded will be precisely held both axially and radially with respect to the centerlines of the machine.

Another principal object is the provision of an elastomeric bead lock having a series of air passages therein which may be employed to vent the interior of the bead lock or to inflate a shaping bladder formed integrally therewith.

Another important object of the present invention is the provision of an expansible bead lock which will form an air seal with respect to the interior of the bead lock when expanded.

A further important object is the provision of a tire building machine which includes an axially expandable and contractible center deck which nonetheless presents a substantially rigid stitching surface.

Another important object is the provision of such machine with a dual bladder turn-up assembly which is constructed in a manner to force the outer bladder to apply or wrap tire components tangentially and sequentially away from the tire bead.

Also, importantly, the invention utilizes common components which may readily be assembled and disassembled on common shafting to provide a machine which will construct tires by the first, second, or single stage process.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a fragmentary quarter section of a single stage machine in accordance with the present invention with the tire carcass expanded to its toroidal shape and with an ultimate position of the shaping bladders shown in phantom lines;

FIG. 4 is a fragmentary broken perspective view of the axially expansible and contractible center deck with the rubber sleeve or covering removed;

FIG. 5 is an exploded view in diametral section of the three major components of the center deck;

FIG. 6 is a fragmentary end elevation taken substantially from the line 6—6 of FIG. 5;

FIG. 7 is a similar end elevation of the center support as seen from the line 7—7 of FIG. 5;

FIG. 8 is an enlarged fragmentary section of the bead lock in its expanded condition illustrating the centering shoulder sealing stops therefor and the air passage system therethrough;

FIG. 9 is a view similar to FIG. 8 on a somewhat reduced scale but showing the center deck axially expanded prior to inflation or shaping of the tire;

FIG. 10 is a fragmentary sectional view of an essentially similar bead lock employed in a second stage machine with the bead lock contracted;

FIG. 11 is a fragmentary sectional view of a second stage machine as seen in FIG. 10 with both bead locks expanded and the tire shaped therebetween;

FIG. 12 is a fragmentary sectional view of a first stage machine in accordance with the present invention utilizing a center deck which may be formed of components similar to those employed in connection with the bead lock; and FIG. 13 is a similar sectional detail of another form of first stage machine which may be used with the present invention illustrating still another form of center deck.

SINGLE STAGE MACHINE—FIGS. 1-9

General Arrangement

Figure 3:
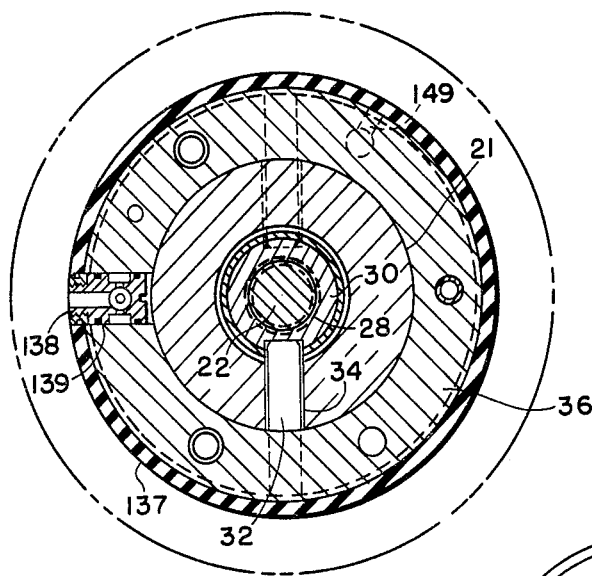
FIG. 3 is an enlarged transverse section taken substantially from the line 3—3 of FIGS. 1 or 2.
Figure 2:
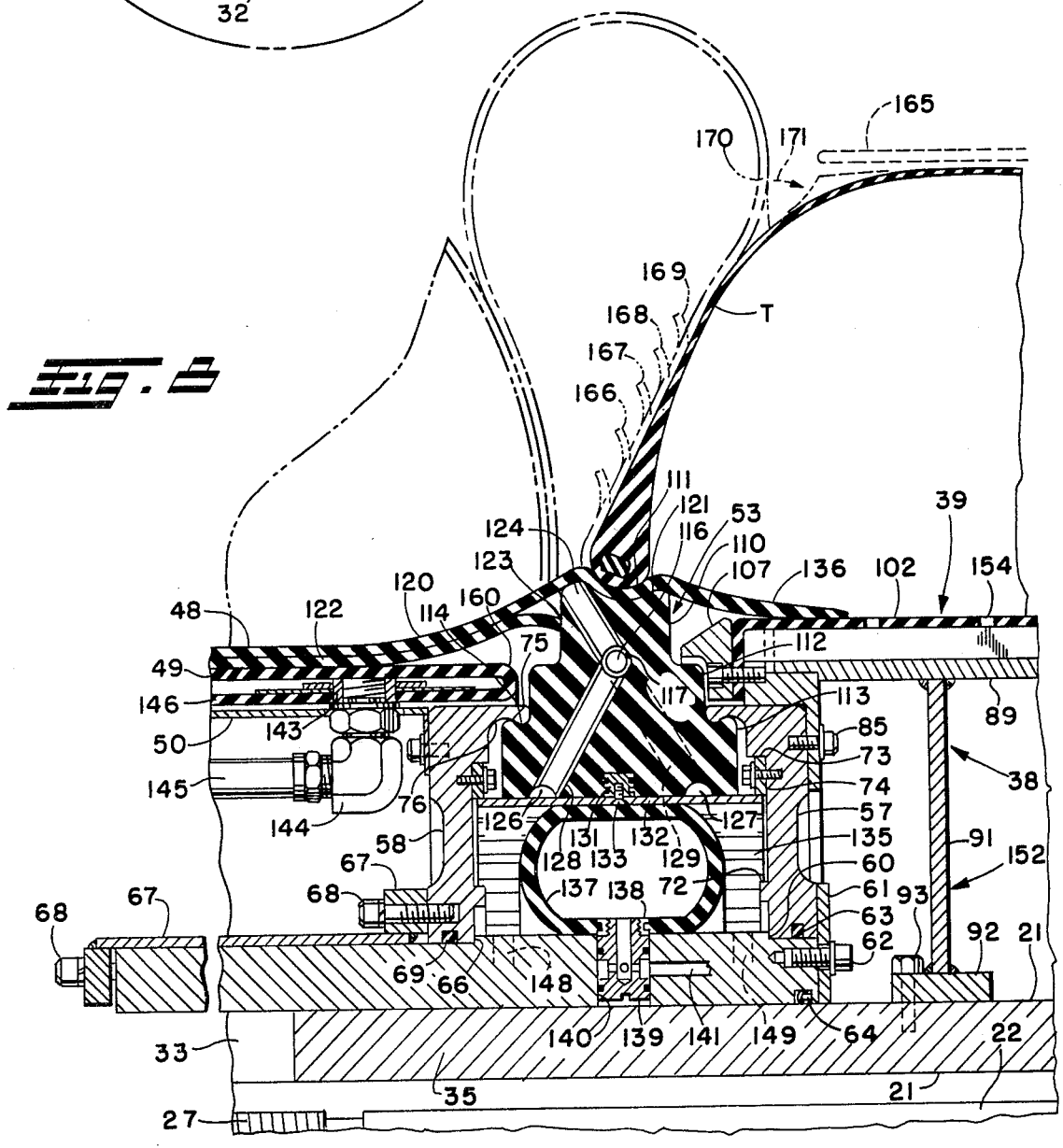
FIG. 2 is a view similar to FIG. 1 but illustrating the machine prior to shaping of the carcass and also more clearly indicating the manner in which tires may be built by the negative crown method.

Referring now to FIGS. 1 and 2 it will be seen that the tire building machine shown generally at 20 is mounted on a main shaft 21 which is tubular and has journaled therewithin a screw shaft 22. The main shaft is flanged as indicated at 23 and the screw shaft is provided with coupling 24 connected to a drive mechanism in the housing to the right in FIG. 1 which will rotate the shafts together or separately through a suitable clutch and brake drive.

The outboard end of the main shaft is provided with pilot nose 25 which may be supported by a retractable tail shock or preferably by the carrier shown in applicant's copending application entitled "Modular Tire Building Machine" filed even date herewith and given Ser. No. 886,743.

The screw shaft 22 is provided with opposite hand threaded sections 27 and 28 which are in mesh with nuts 29 and 30, respectively, which include keys 31 and 32 projecting through slots 33 and 34 and secured to the axial outer ends of inboard and outboard sleeves 35 and 36, all respectively. Such sleves ride or slide on the exterior of the main shaft 21.

With the exception of the center support 38 of the center deck shown generally at 39, the major components are supported on such sleeves for axial sliding movement uniformly toward and away from the transverse centerline 40 of the machine. The other centerline of the machine is the axis 41 of the shafts 21, 22, and of course the sleeves 35 and 36. For precision in tire construction, the components of the tire must be assembled with proper symmetry and squareness with respect to both centerlines.

In addition to the center deck 39, the other major components of the machine are the inboard and outboard bead lock assemblies shown generally at 43 and 44, as well as inboard and outboard dual bladder turn-up assemblies shown generally at 45 and 46. Each dual bladder assembly includes a radial outer bladder 48 and an inner bladder 49. When deflated as seen in full lines in FIGS. 1 and 2, the outer bladder lays over the inner bladder and both are supported in such condition in a cylindrical fashion by cylindrical can or extension 50. As indicated, each bead lock assembly includes a relatively large shouldered rubber band or ring seen at 52 and 53 and the outer bladder of each dual bladder assembly is formed integrally therewith. The inboard bead lock assembly is supported for radial movement between flanges 55 and 56 secured to the sleeve 36 while the assembly 44 is secured for movement between flanges 57 and 58 secured to the sleeve 35. The flanges 55 and 57 are secured to the inner ends of such sleeves. Other than minor variations, such assemblies are identical and only the assembly 44 will be described in detail.

Referring now to FIGS. 8 and 9 it will be seen that the flange 57 is seated against shoulder 60 on the exterior of sleeve 35 and is held in place by retaining ring 61 secured to the inner end of the sleeve by the fastener 62. An O-ring seal is provided between the flange and the exterior of the sleeve as seen at 63. A sliding seal is provided between the sleeve 35 and the shaft 21 as indicated at 64.

The flange 58 is secured against shoulder 66 by elongated flanged clamping sleeve 67 which is secured both to the end of sleeve 35 and flange 58 by fasteners 68. Again, an O-ring seal is provided between the inside of the flange and the exterior of the sleeve as seen at 69. The facing faces of the flanges 57 and 58 are each provided with an inner ridge or stop shoulder seen at 72. Such faces are also provided with an outer ridge or stop shoulder 73 against which is secured by the fasteners shown stop ring 74. The top edge of each flange is formed with an inwardly projecting lip as seen at 75, the undersurface of which is in the form of an axially extending S-curve as indicated at 76. Accordingly, the lip is provided with a bulbous outer edge and a reentrant undercut portion facing toward the axis of the shafts 21 and 22.

Center Deck 39

Referring now additionally to FIGS. 4–7 it will be seen that the center deck 39, in addition to the center support 38 also includes finger rings 78 and 79 secured to the flanges 55 and 57 in the manner more clearly seen in FIGS. 8 and 9. The finger rings 78 and 79 are essentially identical in form and accordingly only the ring 79 will be described in detail. Referring to FIG. 5 it will be seen that the ring 79 includes a cylindrical hub 81 on the exterior of which at one end is secured ring 82. Such ring is slotted and in such slots are secured, as by welding, axially extending fingers or bars 83. Such fingers or bars are equally circumferentially spaced and there may, for example, be 72 such fingers secured to each ring. As indicated more clearly in FIG. 4, such fingers form a cylindrical array. The opposite end of the hub 81 is formed with an inwardly directed flange or wall 84 forming an interior shoulder and fasteners 85 extending through such wall or flange secure the ring 79 to the flange 57 as seen more clearly in FIGS. 8 and 9.

It is noted that the fingers 83 are somewhat spaced from the O.D. of the cylindrical portion 81 of the ring 79. Such spacing accommodates the undercut edges 87 and 88 of the cylindrical ring 89 of the center support 38. Such ring is connected by web 91 to discontinuous hub 92 which is mounted on the shaft 21 by the fasteners seen at 93 in FIG. 8. The discontinuities or the recesses in the hub 92 as seen at 94 may accommodate sliding pipes or tubes interconnecting the sleeves 35 and 36 as seen fragmentarily and out of plane at 95 in FIG. 9. The web 91 may also be provided with significant circular openings therethrough as indicated at 96 in FIG. 7. The exterior of the cylindrical ring 89 is provided with a series of uniformly spaced regularly arranged through slots as seen at 97. If 72 fingers are employed on each finger ring, the through slots will number 144. Alternate through slots will accommodate the fingers from the opposite finger rings. The slots are as deep as the fingers and are slightly oversize readily to accommodate the fingers for sliding movement therein.

When the center deck is expanded as seen in FIGS. 4 and 9, the fingers of opposite finger rings will project only slightly into the alternate slots as shown at 98 and 100, respectively. When in the contracted condition as seen in FIG. 8, the fingers extend substantially through the accommodating slots. Also as seen in FIGS. 8 and 9, an elastic rubber sleeve 102 is clamped to the outer face of the finger rings by transition rings 103 and 104 held in place by fasteners 105. The finger rings and accommodating slots of the center support provide a substantially rigid substructure for the elastic sleeve 102 which will stretch axially as the center deck expands. As seen in FIG. 4, the transition rings may be cut away at 106 to provide access to the fasteners. The exterior of the transition rings are conical as indicated at 107 to provide a relatively smooth transition surface between the center deck and the bead locks 52 and 53 in their retracted condition as seen in FIG. 4.

The Bead Locks

Referring now more particularly to FIGS. 8 and 9 it will be seen that the rubber band 53 forming the bead lock 44 includes a most narrow radially extending projection 110 which includes on the outer surface thereof an arcuate bead seat 111, the center of which is slightly offset toward the transverse centerline 40 of the machine. The band includes an intermediate portion of intermediate width as seen at 112, such width in the expanded state of the band being designed to fit closely yet with some clearance between the rounded lips 75 of the opposing flanges 57 and 58. Finally, the band includes a most wide interior porton 113 which joins the intermediate portion by means of reentrant or grooved shoulders 114 adapted to receive the bulbous lips 75 and seat within the reentrant or S-shape underside 76 of the lips. In this manner when the band expands it will form an air seal on each side thereof between the lips and the shoulders 114 and the shape of such shoulders as well as the lips will precisely center the band and maintain the band centered when expanded to lock a tire bead.

When the band is molded, it is formed with a completely circumferential air passage as seen at 116 and a garter spring or like reinforcement 117 is positioned therein. The garter spring may be positioned in the band by molding the band in two separate pieces prior to vulcanization.

Formed integrally with the band 53 is an outer shaping bladder 48, the upper or inner wall of which as seen at 120 is attached at 121 near the interior of the bead seat 111. In this manner the wall of the bladder adjacent its point of attachment actually forms the bead seat. The lower wall 122 is secured to the exterior of the most narrow portion 110 of the band somewhat spaced from the top thereof as seen at 123 to provide clearance for diagonal passages 124 extending from the circumferential passage 116 to the interior of the bladder.

The interior of the band 53 is provided with two axially spaced interior circumferential grooves as seen at 126 and 127 and a series of diagonal passages seen at 128 and 129 interconnect such grooves, respectively, with the center circumferential air passage 116. When molded, the interior of the band is provided with a series of inserts 131, each of which is provided with a blind tapped hole so that deck plates or slats 132 may be secured to the interior of the band by the fasteners 133. In the expanded condition of the band, the plates or slats circumferentially separate exposing the grooves 126 and 127 to the chamber 135. Also, when expanded, the edges of the plates 132 engage the gauge rings 74 to ensure accurate expansion to a given T.I.R. (total indicator runout). In sequence, the bead lock first grabs or grips the I.D. of the bead, then comes up to form the seal against the lips 75, ensuring proper axial position, and finally the plates engage the gauge ring 74 ensuring the noted T.I.R. or circularity within a given tolerance of the axis 41.

Also formed integrally with the band is an interior flipper 136 which simply lays upon the center deck 39. Such flipper serves to protect the interior sealing surfaces from ingress of dirt or foreign matter common in tire building environments.

The band is expanded by means of a tubular element 137 which includes a molded-in insert 138 connected to fitting 139 sealed in transverse passage 140 in the sleeve 35. When air is supplied through passage 141, the tube 137 is expanded.

The inner bladder 49, although not part of the bead lock may be contour molded annularly and a stem indicated at 143 may be included in the molding process. A fitting 144 is connected to the stem for inflation of the inner bladder through the air supply line 145. The stem may extend through the can 50 and may assist in locating and assembling the bladder. As indicated, the can is secured to the exterior of the flange 58. Preferably, the inner bladder 49 includes a belt or band 146 which may be molded in during the tube forming process. The belt or band restrains the bladder when inflated to maintain a portion of the inner wall against the can. Normally the bladder would tend to come to a circular shape on the centerline of the stem. However, with the restraining band the inflation of the bladder can be controlled properly to wrap tire materials about the bead and to apply components such as sidewalls. The outer bladder 48 is inflated when the bead lock is expanded by admitting air under pressure through passages 148 and 149 to the sealed chamber 135 which, as previously noted, is in fluid communication with the outer bladder through the passage system in the bead lock band. In this manner the outer bladder is free of restraint from stems or fittings and is able to function properly to wrap or apply tire components as hereinafter described.

To expand the tire carcass to the toroidal shape seen for example in FIG. 1 or 8 as compared to FIGS. 2 or 9, air is admitted to the interior of the chamber formed by the seals of the bead locks both with respect to the flanges 55 and 57 as well as the beads of the tire. Such chamber is shown generally at 152 and air may be admitted to such chamber through the ports 153 in the sleeve 36. Since the elastomeric sleeve 102 surrounding the center deck 39 is not a shaping bladder, it is provided with air vents as seen at 154 so that pressure within the chamber 152 will be applied directly to the interior of the tire carcass T. It will of course be appreciated that the elastomeric sleeve may be a shaping bladder and in such case would be imperforate.

SINGLE STAGE MACHINE—OPERATION

With the single stage tire building machine disclosed, a wide variety of process or building steps may be employed depending upon the components employed in the tire. For illustrative purposes, the following is a brief discussion of the sequential steps which may be employed to construct a relatively large truck tire.

In the start position the center deck is expanded as seen in FIG. 2 and the bead locks as well as the shaping bladders are exhausted. In such start condition, the machine forms an elongated generally cylindrical drum having a diameter preferably somewhat less than the inside diameter of the bead of the tire to be built. In such start condition, the inner edge of the inner bladder 49 as indicated at 160 is flat and adjacent the shoulder 161 of the bead lock band in its retracted position and the surface presented thereby is generally cylindrical as seen for example in FIG. 4.

Initially, the operator will place on the drum carefully centering the same with respect to the transverse centerline 40 an inner liner followed by components such as wire chafers, the body ply, sidewalls, and belt cushions. The body plies of course extend axially beyond the bead locks. The sidewalls may be applied directly to the deflated cylindrical or flat outer bladders 48. The belt cushions may be stitched to the body ply and are in the form of fillets between the belt and body ply when the tire is finished. After such components are applied and stitched as necessary, a bead setting mechanism such as seen in applicant's aforementioned copending application entitled "Modular Tire Building Machine" may be employed properly to position the beads with respect to the bead locks. The bead locks are now expanded into the beads as seen more clearly in FIGS. 2 and 9. As noted in such figures, as the bead locks expand, the body plies stretch or enlarge in the area of the beads.

When constructing radial tires, the cords or reinforcement of the body plies extend axially of the drum and in order to wrap such plies uniformly around the beads B free of distortion and wrinkling, it may be desirable actually to circumferentially uniformly stretch the body plies in the area of the bead. This is of course done by the expanding bead lock since the diameter of the body plies in the area of the bead is then significantly greater than the diameter of the plies at the crown or transverse centerline 40. The process illustrated in FIGS. 2 and 9 is known as "negative crown" building.

After the beads are locked, a bead apex or fillers may be applied inside the beads. Some beads already include the apex or filler.

At this point the tire carcass T may be preinflated simply to ensure that the carcass is free of the sleeve 102 of the deck 39. In such preinflation, the carcass may bulge outwardly approximately the same extent as the negative crown seen in FIGS. 2 and 9. In order to ensure that the beads will not move, the outer bladders 48 may here be preinflated.

With the bead locks continuing in their expanded condition, the carcass now may be preshaped to approximately 80% of its final shape such as seen in FIG. 1. This is accomplished by locking the main shaft 21 while rotating the screw shaft 22. The center deck 39 automatically axially contracts as the carcass is inflated and the bead locks move uniformly toward each other. At this point a previously constructed belt or belt and tread assembly may be transferred axially of the machine to the transverse centerline 40. The belt is shown schematically at 165 in FIGS. 1 and 8. In such position the belt is held by a transfer at the transverse centerline 40. The carcass is now fully shaped into the interior of the belt.

At this point the outer bladders 48 may be fully inflated to wrap the body plies around the bead. Initially only the outer bladder 48 will be inflated and as it is inflated it will press against the outside of the tire T uniformly and sequentially moving away from the bead B to approximately the position seen at 166 in FIG. 8. In such condition the bead area will then be tightly wrapped and the sidewalls positioned on the outer bladder 48 may begin to adhere.

Now the inner bladders 49 are inflated to force the outer bladders 48 and the sidewall carried thereby to move tangentially up the sidewall of the carcass as seen by the phantom line positions shown for example at 167, 168, 169 and finally at 170. Full inflation of both bladders will cause the outer edge of the sidewall to snap or flip over as indicated by the arrow 171 in FIG. 8 as the sidewall in effect turns itself inside out.

The inner bladders may now be deflated and when deflated they return to their generally cylindrical flat condition. The outside bladder, however, may remain inflated or partially inflated to lock the beads securely during stitching. After both bladders are deflated, the bead locks may be collapsed and the tire removed. The bead locks will then traverse outwardly to their original position and another tire may be constructed.

If desired additional stitching may take place before the tire is exhausted and removed.

It will be appreciated that the steps described above may vary considerably and the sequence may also vary. For example, some tires are built with the sidewall over the tread and others are built with the tread over the sidewall. In the latter case the sidewall may be applied before the tread. Also, the belt or belt and tread assemby may be constructed directly on the shaped carcass or band as the tire in its shaped condition is rotated.

It will further be appreciated that the machine of FIGS. 1-9, although not optimally designed therefor, may be used simply as a first stage machine or simply as a second stage shaping machine. In the case of the former, the center deck would not contract and the bead locks would not move toward each other. The dual bladder assemblies would simply inflate, usually simultaneously, to wrap the plies about the bead. The bead locks would then release the unshaped tire band. The tire band would then be shaped and completed at a second stage machine such as described below. Components such as sidewalls and belt cushions could be stitched to the cylindrical band prior to shaping, particularly in view of the essentially rigid nature of the center deck even when expanded.

SECOND STAGE MACHINE—FIGS. 10 AND 11

Referring first to FIG. 11 it will be seen that common components are employed on the same shafting to provide an expandable bead lock shaping machine for converting a cylindrical tire band or carcass to toroidal shape. The same sleeves 35 and 36 are employed together with the identical flanges 55 and 56 paired on the sleeve 36 and 57 and 58 paired on the sleeve 35. The bead locks shown generally at 180 and 181 include large shouldered elastomeric bands 182 and 183 which are essentially similar to the bands 52 and 53 of the single stage machine and in fact can be made from the same mold. The bands 182 and 183 lack however the integrally formed shaping bladder. The intermediate portions of such bands fit precisely between the bulbous or reentrant lips of the paired flanges and form an air seal when the bead lock is expanded by means of the tube 137 bearing against the slats or shoes 132 secured to the interior of the band. FIG. 10 shows the bead lock 180 contracted while FIG. 11 shows bead locks 180 and 181 expanded and moved toward each other to shape the tire T to its toroidal shape. When the bead locks are expanded, an air seal is formed between the band and the stop flanges making the chamber 185 within the tire airtight. Air under pressure is then supplied to the chamber through the opening 186 as the expanded bead locks move uniformly toward each other symmetrically with respect to the transverse centerline 40 of the machine.

In order to facilitate the loading and unloading of the machine, the flanges 58 and 55 have secured thereto on the outboard side thereof pilots indicated at 187 and 188 each of which includes a conical pilot surface as seen at 189 and 190. Such pilots assist the operator in placing a tire carcass on the machine or removing a shaped tire therefrom. Such pilots are particularly useful in connection with relatively large truck tires.

The air passage system in each band as seen at 192 and 193, used in the single stage machine for inflating the bladder, is used in the second stage machine for venting to atmosphere the chambers 194 and 195 which would otherwise be sealed. This precludes the build-up of excessive pressure which might inhibit the proper operation of the bead locks. Alternatively, the chambers may be vented through the tapped sight holes 198 normally plugged.

FIRST STAGE MACHINE—FIGS. 12 OR 13

In FIGS. 12 and 13 there is illustrated two forms of a first stage machine utilizing the same bead lock and dual bladder assemblies as in connection with the single stage machine of FIG. 1. As indicated previously, the bladders may be inflated after the beads are locked up to wrap the body ply around the beads. In the first stage machine the bladders are usually inflated essentially simultaneously. Such bladders may be utilized in connection with stationary or axially movable reaction members in known fashion.

In order to support the tire carcass during the construction and should stitching be required after ply turning, there is provided in FIG. 12 a radially expansible center deck shown generally at 200 which includes a relatively thick elastomeric outer sleeve 201 which is supported by a multitude of axially extending slats or shoes 202 each of which is secured by the fasteners indicated at 203 to the inserts 204 molded into the outer periphery of a relatively large shouldered rubber band 205. The band 205 is generally similar to the inner component of the band 53 and again may be made from the same mold. The inner periphery of the band 205 is provided with inserts 207 to which are secured slats or shoes 208. The lateral edges of such slats are each provided with tongues fitting in radially extending slots 209 in flanges 210 which in turn are secured to sleeve 211. The tongue and slot arrangement keeps the center deck from rotating as the drum rotates. Relative radial movement is obtained by one or more inflatable tubes 212 positioned around the sleeve 211. Such tubes may be the same as the tubes 137 for the bead locks. In the embodiment shown in FIG. 12, the center deck 200 may expand and contract with the bead locks. Depending upon the axial length of the deck required, the band and tube construction may be repeated two or three times to obtain the desired axial length.

As seen in FIG. 13, the center deck 220 employs similar components 201, 202, 210, 208, 209, 211 and 212 to the deck 200. However, in lieu of the bands 205, there is employed side by side round wire, rectangular section garter springs as seen at 221 and 222 extending between the slats 208 and the relatively heavier slats 202. Again, however, a radially expansible center deck is provided which may move with or with respect to the expansible bead locks.

It can now be seen that there is provided a tire building machine which in the preferred embodiment can in a single stage completely construct a tire such as a relatively heavy radial truck tire. Even though the preferred embodiment has single stage capability, it can of course also be employed as a first stage or second stage machine. There is also provided by the invention first and second stage machines each using components also used in the single stage machine and interchangeable therewith.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. A tire building machine comprising a radially expanding annular elastomeric bead lock, an annular shaping bladder integral with said bead lock, and passage means in said bead lock for inflating said bladder through said bead lock.

2. A tire building machine as set forth in claim 1 including a chamber radially internally of said bead lock which supports said bead lock for radial movement, and means to pressurize said chamber when said bead lock is expanded to inflate said bladder.

3. A tire building machine comprising a radially expanding bead lock, a shaping bladder, means to inflate said bladder through said bead lock, a chamber internally of said bead lock, and means to pressurize said chamber when said bead lock is expanded to inflate said bladder, said bead lock including means to seal said chamber when expanded.

4. A tire building machine comprising a radially expanding bead lock, a shaping bladder, means to inflate said bladder through said bead lock, a chamber internally of said bead lock, and means to pressurize said chamber when said bead lock is expanded to inflate said bladder, said chamber including facing flanges, said flanges including means to seal said chamber when said bead lock is expanded.

5. A tire building machine as set forth in claim 4 including facing lips on said flanges, and shoulders on said bead lock engageable with said lips to seal said chamber after said bead lock is expanded and locked into the tire beads.

6. A tire building machine as set forth in claim 5 wherein said lips include a reentrant under surface, and said shoulders include a groove mating therewith when said bead lock is expanded not only to seal said chamber but also to hold said bead lock against movement radially and axially thereof.

7. A tire building machine as set forth in claim 6 wherein the under surface of said lips and said shoulders are in the shape of an axially extending S.

8. A tire building machine as set forth in claim 2 including an inflatable tube in said chamber operative to expand said bead lock when said tube is inflated.

9. A tire building machine as set forth in claim 1 wherein said bead lock is a continuous elastomeric band and includes an internal central air passage completely circumferentially thereof.

10. A tire building machine as set forth in claim 9 including a metallic reinforcement in said air passage to preclude collapse thereof when said bead lock is expanded.

11. A tire building machine comprising a radially expanding bead lock, a shaping bladder, means to inflate said bladder through said bead lock, a chamber internally of said bead lock, means to pressurize said chamber when said bead lock is expanded to inflate said bladder, an inflatable tube in said chamber operative to expand said bead lock when said tube is inflated, and port means in said bead lock and said chamber offset from said tube.

12. A tire building machine comprising a radially expanding bead lock, a shaping bladder, means to inflate said bladder through said bead lock, said bead lock being a continuous elastomeric band and including an internal central air passage completely circumferentially thereof, a metallic reinforcement in said air passage to preclude collapse thereof when said bead lock is expanded, a bladder integrally formed with said bead lock, and branch passages extending from said central passage to said bladder.

13. A tire building machine as set forth in claim 12 including branch passages extending from said central passage to said chamber.

14. A tire building machine as set forth in claims 12 or 13 wherein said branch passages extend at an acute angle with respect to the axis of the bead lock.

15. A tire building machine as set forth in claim 12 wherein an edge portion of said bladder forms the bead seat of said bead lock.

16. A tire building machine as set forth in claim 15 wherein the bladder forming bead seat is curved in axial section, the center of the curve being inwardly offset.

17. In a tire building machine, the combination of a radially expanding annular bead lock and an integrally formed shaping bladder, the former having a radially outward shouldered surface and the latter being attached adjacent said surface and extending axially away from said surface and the former including air passage means to inflate the latter.

18. A tire building machine comprising a radially expanding bead lock, a shaping bladder, and means to inflate said bladder through said bead lock, said bead lock being a continuous elastomeric band and including an internal central air passage completely circumferentially thereof, a metallic reinforcement in said air passage to preclude collapse thereof when said bead lock is expanded, said reinforcement being in the form of a garter spring.

19. In a tire building machine, the combination of a radially expanding bead lock and an integrally formed shaping bladder, the former including air passage means to inflate the latter, said air passage means including an annular internal passage in said bead lock, and branch passages connected thereto to inflate the bladder.

20. A tire building machine combination as set forth in claim 19 including a spiral spring in said annular passage.

21. A tire building machine combination as set forth in claim 19 wherein the I.D. of said bead lock forms the O.D. of a sealed chamber when expanded, and branch passages from said annular passage to said chamber to inflate said bladder through said chamber when said bead lock is expanded.

22. A tire building machine combination as set forth in claim 21 including shoulder stop means on said bead lock operative to seal said chamber when said bead lock is expanded.

23. A tire building machine as set forth in claim 17 including shoulder stop means operative to hold said bead lock against axial movement when expanded.

24. A machine as set forth in claim 23 wherein said shoulder stop means is in the form of an axially extending S.

25. A machine as set forth in claim 23 wherein said shoulder stop means forms an air seal for the interior of a tire held by said bead lock so that such tire may be inflated.

26. A machine as set forth in claim 23 including vent means operative to vent the inner diameter of said bead lock to atmosphere.

27. A machine as set forth in claim 23 including two radially expanding bead locks, one for each bead of a tire, said shoulder stop means for each bead lock forming an air seal for the interior of the tire when said bead locks are expanded.

28. A machine as set forth in claim 27 including means to move said bead locks uniformly toward and away from each other.

29. A machine as set forth in claim 28 including a pair of flanges for each bead lock forming part of said shoulder stop means, and means to vent the I.D. of said bead locks to atmosphere when expanded.

30. A machine as set forth in claim 29 including an inflatable tube between each pair of flanges operative to expand said bead locks against said shoulder stop means.

31. A machine as set forth in claim 27 including conical pilot means for each bead lock, each having a diameter smaller than the bead lock when expanded and larger than the bead lock when not expanded.

32. A machine as set forth in claim 23 including two bead locks, one for each bead of the tire, and a cylindrical center deck therebetween, means to move said bead locks toward and away from each other and means axially to expand and contract said center deck as said bead locks thus move.

33. A machine as set forth in claim 32 wherein said deck includes end flanges movable toward and away from each other to expand and contract said deck axially, each flange including a circular array of fingers extending axially toward each other to form a substantially rigid cylindrical surface for said deck, the fingers on each flange being circumferentially offset to interfit with the fingers on the other as the flanges move toward each other.

34. A tire building machine comprising two radially expanding bead locks, one for each bead of the tire, shoulder stop means operative to hold said bead locks against axial movement when expanded, a cylindrical center deck between said bead locks, means to move said bead locks toward and away from each other, means axially to expand and contract said center deck as said bead locks thus move, said deck including end flanges movable toward and away from each other to expand and contract said deck axially, each flange including a circular array of fingers extending axially toward each other to form a substantially rigid cylindrical surface for said deck, the fingers on each flange being circumferentially offset to interfit with the fingers on the other as the flanges move toward each other, and a center support for said fingers having a cylindrical surface, said surface including axially extending slots for said fingers.

35. A machine as set forth in claim 34 wherein alternate slots in said surface accommodate fingers from opposite flanges, respectively.

36. A machine as set forth in claim 35 wherein said fingers are always seated in the respective accommodating slot of said center support regardless of the axial movement of said flanges.

37. A machine as set forth in claim 36 wherein said fingers extend only to the adjacent edge of said center support when said deck is axially expanded.

38. A machine as set forth in claim 37 wherein said fingers extend to the far edge of said center support when said deck is axially contracted.

39. A machine as set forth in claim 38 wherein said center support has the same radius as the radial outer edge of each array of fingers.

40. A machine as set forth in claim 33 including an axially extensible elastomeric sleeve surrounding said fingers and secured to each flange.

41. A machine as set forth in claim 40 wherein said sleeve is perforate so that when the chamber within said sleeve is pressurized said sleeve will not expand.

42. A machine as set forth in claim 34 including a shaft for said flanges, each flange being secured to a sleeve axially movable on said shaft and rotatable therewith, each of said array of fingers including a ring including an inwardly offset wall secured to the interior face of the respective flange.

43. A machine as set forth in claim 42 wherein said center support is undercut at its edges to clear said offset wall and extend axially beyond the axially inner end of the sleeve of the respective flange when said deck is contracted.

44. A machine as set forth in claim 23 including bead locks for each bead of the tire, a center deck therebetween, and means radially to expand and contract said center deck.

45. A machine as set forth in claim 44 including inflatable tube means to expand both said bead locks and said center deck.

46. A machine as set forth in claim 45 wherein said bead locks each comprise and said center deck includes a shouldered elastomeric band of in part the same sectional configuration.

47. A machine as set forth in claim 45 wherein said center deck includes a relatively rigid elastomeric surface, and spring means between said surface and said inflatable tube means.

48. A machine as set forth in claim 47 wherein said spring means includes a garter spring of rectangular cross section.

49. A tire building machine comprising a rotatable drum, said drum including a substantially rigid, axially continuous cylindrical deck, said deck including end flanges movable toward and away from each other to expand and contract said deck axially, each flange including a circular array of fingers extending axially toward each other to form such substantially rigid cylindrical surface for said deck, the fingers on each flange being circumferentially offset to interfit with the fingers on the other as the flanges move toward each other, and a center support for said fingers having a cylindrical surface, said surface including axially extending slots for said fingers.

50. A tire building machine as set forth in claim 49 wherein alternate slots in said surface accommodate fingers from opposite flanges, respectively.

51. A tire building machine as set forth in claim 50 wherein said fingers are always seated in the respective accommodating slot of said center support regardless of the axial movement of said flanges.

52. A tire building machine as set forth in claim 51 wherein said fingers extend only to the adjacent edge of said support when said deck is axially expanded.

53. A tire building machine as set forth in claim 52 wherein said fingers extend to the far edge of said center support when said deck is axially contracted.

54. A tire building machine as set forth in claim 53 wherein said center support has the same radius as the radial outer edge of each array of fingers.

55. A tire building machine as set forth in claim 49 including an axially extensible elastomeric sleeve surrounding said fingers and secured to each flange.

56. A tire building machine as set forth in claim 55 wherein said sleeve is perforate so that when the chamber within said sleeve is pressurized said sleeve will not expand.

57. A tire building machine as set forth in claim 49 including a shaft for said drum, each flange being secured to a sleeve axially movable on said shaft and rotatable therewith, each of said array of fingers including a ring including an inwardly offset wall secured to the interior face of the respective flange.

58. A tire building machine as set forth in claim 57 wherein said center support is undercut at its edges to clear said offset wall and extend axially beyond the axially inner end of the sleeve of the respective flange when said deck is contracted.

* * * * *